(12) United States Patent
Shan et al.

(10) Patent No.: US 8,233,844 B2
(45) Date of Patent: Jul. 31, 2012

(54) APPARATUS AND METHOD FOR JOINT POWER CONTROL IN A WIRELESS COMMUNICATION SYSTEM

(75) Inventors: Cheng Shan, Suwon-si (KR); David Mazzarese, Suwon-si (KR); Kathiravetpillai Sivanesan, Suwon-si (KR); Eun-Taek Lim, Suwon-si (KR); Dong-Seek Park, Yongin-si (KR); Geun-Ho Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1197 days.

(21) Appl. No.: 12/008,608

(22) Filed: Jan. 11, 2008

(65) Prior Publication Data
US 2008/0171565 A1    Jul. 17, 2008

(30) Foreign Application Priority Data

Jan. 12, 2007  (KR) .................. 10-2007-0004003

(51) Int. Cl.
*H04B 1/00* (2006.01)
*H04B 15/00* (2006.01)

(52) U.S. Cl. .............. 455/63.1; 455/522; 455/67.13; 455/422.1; 455/501; 455/509; 370/232; 370/252; 370/329

(58) Field of Classification Search .............. 455/63.1, 455/522, 13.4, 67.11, 67.13, 68, 179.1, 422.1, 455/450, 501, 509; 370/232, 252, 329
See application file for complete search history.

(56) References Cited

U.S. PATENT DOCUMENTS

| 5,696,903 | A | 12/1997 | Mahany |
| 6,212,566 | B1 | 4/2001 | Vanhoof et al. |
| 6,295,461 | B1 | 9/2001 | Palmer et al. |
| 6,374,079 | B1 | 4/2002 | Hsu |
| 7,076,246 | B2 | 7/2006 | Chitrapu |
| 2002/0141349 | A1* | 10/2002 | Kim et al. ............. 370/252 |
| 2008/0089279 | A1* | 4/2008 | Hu et al. ............... 370/329 |

FOREIGN PATENT DOCUMENTS

| KR | 1020030005899 A | 1/2003 |
| KR | 1020060040765 A | 5/2006 |
| WO | WO 03/090037 A3 | 10/2003 |

OTHER PUBLICATIONS

Extended European Search Report dated Jun. 6, 2012 in connection with European Patent Application No. 08000480.7, 8 pages.
Cordeiro, Carlos, et al; "Cognitive PHY and MAC Layers for Dynamic Specrum Access and Sharing of TV Bands"; Proceedings of the First International Workshop on Technology and Policy for Accessing Spectrum, TAPAS, Jan. 1, 2006, 11 pages.
Hoven, Niels, et al.; "Power Scaling for Cognitive Radio"; 2005 International Conference on Wireless Networks, Communications and Mobile Computing, Jun. 13-16, 2005; pp. 250-255.

* cited by examiner

*Primary Examiner* — Shaima Q Aminzay

(57) ABSTRACT

An apparatus and a method for joint power control in a wireless communication system are provided, in which customer premise equipments to be serviced are selected by scheduling, upon receipt of service requests from the customer premise equipments, the interference level of each of the selected customer premise equipments that affects an incumbent system is calculated, a total interference level affecting the incumbent system is calculated by summing the interference levels of the selected customer premise equipments, and a transmit power of the each customer premise equipment is reduced, if the total interference level is larger than a threshold.

24 Claims, 3 Drawing Sheets

APPARATUS AND METHOD FOR JOINT POWER CONTROL IN A WIRELESS COMMUNICATION SYSTEM

CROSS-REFERENCE TO RELATED APPLICATION(S) AND CLAIM OF PRIORITY

This application claims the benefit under 35 U.S.C. §119(a) of a Korean Patent Application filed in the Korean Intellectual Property Office on Jan. 12, 2007 and assigned Serial No. 2007-0004003, the entire disclosure of which is hereby incorporated by reference.

TECHNICAL FIELD OF THE INVENTION

The present invention generally relates to a wireless communication system. More particularly, the present invention relates to an apparatus and a method for performing joint power control in a Cognitive Radio (CR) wireless communication system.

BACKGROUND OF THE INVENTION

A variety of ever-evolving wireless communication technologies have become necessities to daily living. The wireless communication technologies have evolved from 2nd Generation (2G) Code Division Multiple Access (CDMA) to 3rd Generation (3G) International Mobile Telecommunication-2000 (IMT-2000) in which data as well as voice is fast transmitted. Wireless Broadband (WiBro) or future-generation wireless communication systems are under development for faster data service than IMT-2000.

To co-exist with incumbent systems, the new wireless communication systems require different frequencies. However, since all available frequencies are occupied, a new frequency assignment within a few gigaherts is difficult and limited free frequency bands cause frequency interference between heterogeneous devices deploying a new wireless communication system. Yet, there are unused spectrums at or above 2 GHz and partially unused TV spectrums at or below 1 GHz. Hence, the Federal Communications Commission (FCC) has conducted a study on real spectrum use of these unused or underutilized frequencies and sought comments on unlicensed access to unused frequencies through the Notice of Proposed Rule Making (NRPM) in order to increase frequency use efficiency.

In this context, J. Mitola introduced CR technology that senses an unused frequency or channel among allocated frequencies and efficiently shares the unused frequency. Although the CR technology is effective in solving the problem of limited frequencies, it is required that CR users do not cause harmful interference to authorized user, namely primary users by the frequency sharing.

Conventionally, a CR wireless communication system allocates explicit time-frequency resources as well as transmit power to Mobile Stations (MSs) by use of a scheduler, upon their service request. From the viewpoint of primary users that are charged for use of frequency bands, they may experience performance degradation due to inference from multiple users as well as a single user.

Accordingly, there exists a need for an apparatus and method for preventing multiple MSs from causing interference to primary users in a CR wireless communication system, when they transmit data simultaneously.

SUMMARY OF THE INVENTION

To address the above-discussed deficiencies of the prior art, it is a primary aspect of exemplary embodiments of the present invention to address at least the problems and/or disadvantages and to provide at least the advantages described below. Accordingly, an aspect of exemplary embodiments of the present invention is to provide an apparatus and method for allocating radio resources in a wireless communication system.

Another aspect of exemplary embodiments of the present invention is to provide an apparatus and method for performing joint power control in a CR wireless communication system.

A further aspect of exemplary embodiments of the present invention is to provide an apparatus and method for preventing an MS from interfering with a primary user in a CR wireless communication system, when the MS attempts to receive a service in the same frequency band as the primary user or a frequency band adjacent to the frequency band of the primary user.

In accordance with an aspect of exemplary embodiments of the present invention, there is provided a method for controlling power in a CR wireless communication system, in which customer premise equipments (CPEs) to be serviced are selected by scheduling, upon receipt of service requests from the CPEs, the interference level of each of the selected CPEs that affects an incumbent system is calculated, and a total interference level affecting the incumbent system is calculated by summing the interference levels of the selected CPEs.

In accordance with another aspect of exemplary embodiments of the present invention, there is provided an apparatus for controlling power in a CR wireless communication system, in which a scheduler selects CPEs to be serviced by scheduling, upon receipt of service requests from CPEs, a path loss calculator calculates the interference level of each of the selected CPEs that affects an incumbent system and calculates a total interference level that reaches a protected contour of the incumbent system using the interference levels, and a power controller reduces the transmit power of the each CPE, if the total interference level is larger than a threshold.

In accordance with a further aspect of exemplary embodiments of the present invention, there is provided a method for controlling power in a CR wireless-communication system, in which the interference level of each of BSs that affects an incumbent system is calculated, a total interference level affecting the incumbent system is calculated by summing the interference levels of the BSs, and the transmit power of the each BS is reduced, if the total interference level is larger than a threshold.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, the same drawing reference numerals will be understood to refer to the same elements, features and structures.

DETAILED DESCRIPTION OF THE INVENTION

Figure 1:
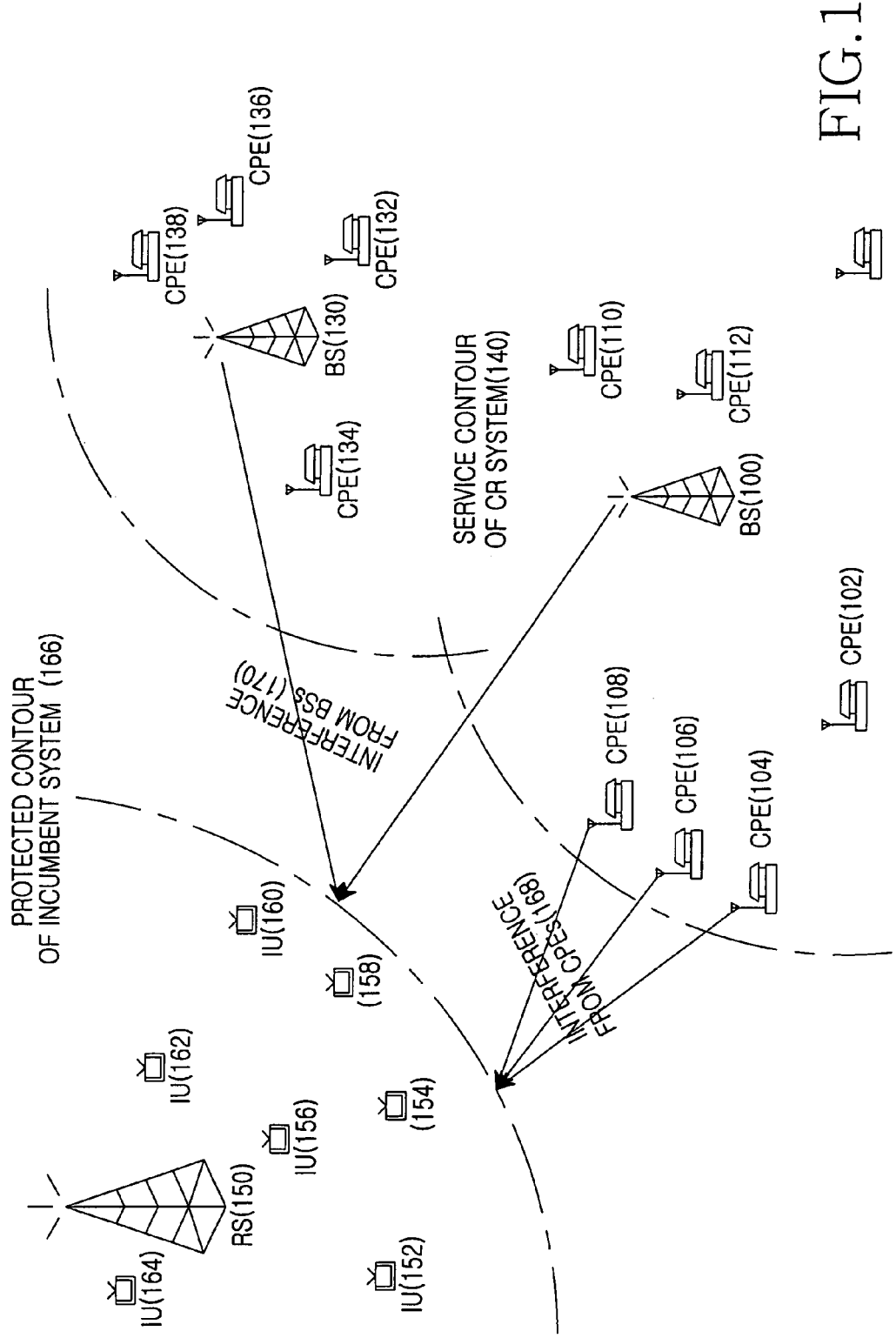
FIG. 1 illustrates the configuration of a CR wireless communication system according to an exemplary embodiment of the present invention.
Figure 2:
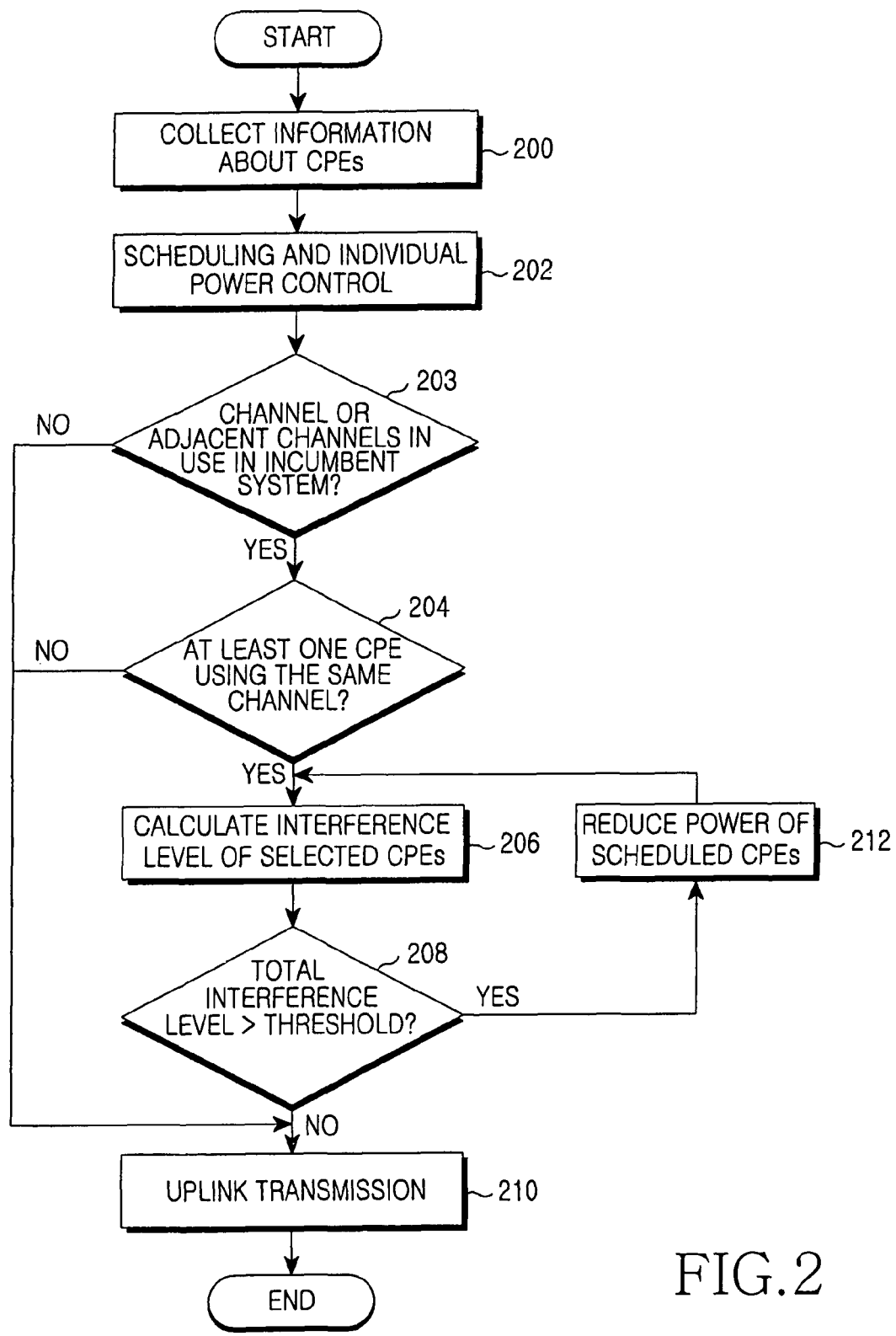
FIG. 2 is a flowchart of a joint power control operation in the CR wireless communication system according to an exemplary embodiment of the present invention.
Figure 3:
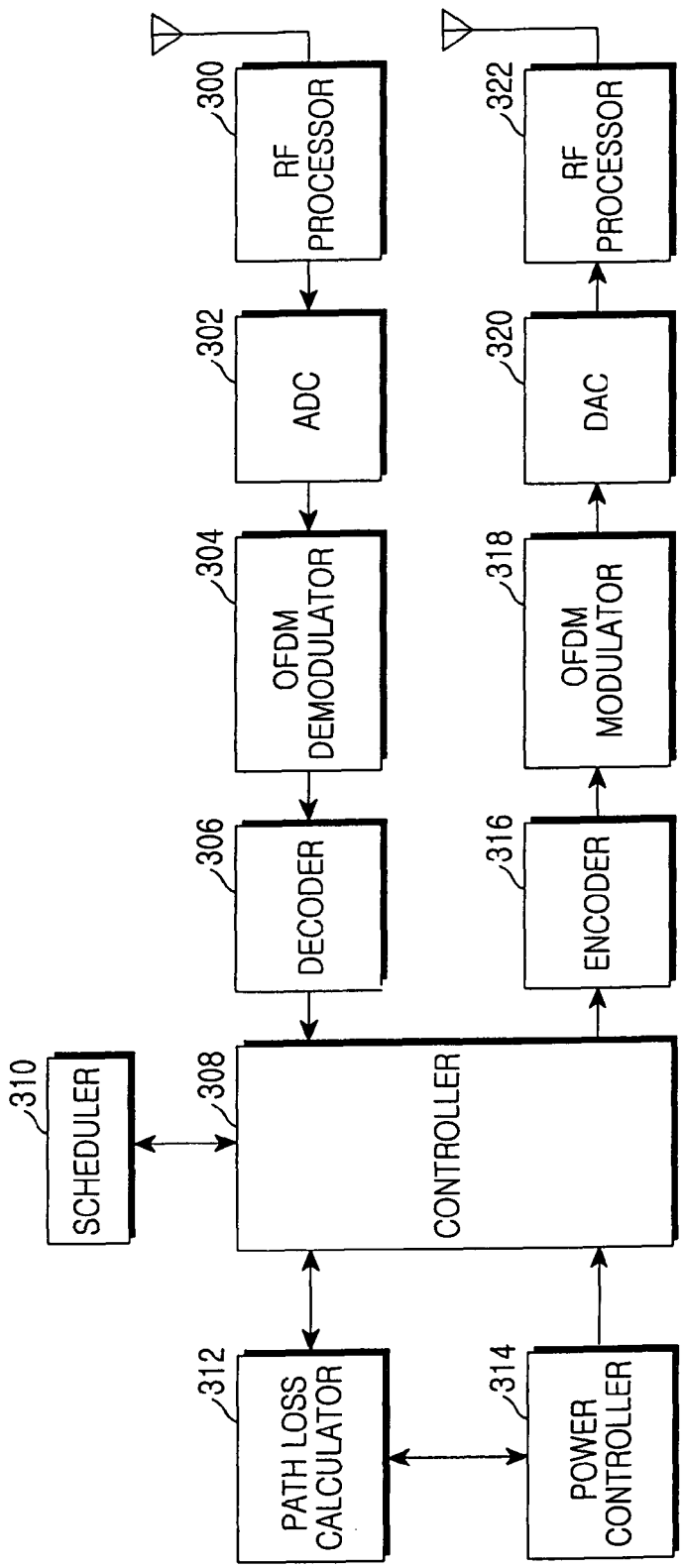
FIG. 3 is a block diagram for a joint power control apparatus in the CR wireless communication system according to an exemplary embodiment of the present invention.

FIGS. 1 through 3, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

Exemplary embodiments of the present invention provide a joint power control apparatus and method for mitigating interference caused by frequency sharing among MSs in a CR wireless communication system. The CR wireless communication system is referred to as a CR system. The CR system can collect geo-location information from the Global Positioning System (GPS) and form geo-location information by collecting information from the GPS. The geo-location information includes information about the protected contour of an incumbent system.

FIG. 1 illustrates the configuration of a CR wireless communication system according to an exemplary embodiment of the present invention.

Referring to FIG. 1, an incumbent system includes a Relay Station (RS) 150 and Incumbent Users (IUs) 152 to 164. The incumbent system is a system that uses a licensed frequency band in the CR technology. An IU is a receiving terminal, for example, a TV receiver. The RS 150 receives a TV broadcasting signal from a broadcasting station and broadcasts the TV broadcasting signal to the IUs 152 to 164. The IUs 152 to 164 receive a broadcasting service within the protected contour 166 of the incumbent system by the TV broadcasting signal.

A CR system includes Base Stations (BSs) 100 and 130 and Customer Premise Equipments (CPEs) 102 to 112 and 132 to 138.

The BSs 100 and 130 schedule services for the MSs 102 and 112 and the MSs 132 to 138 within their service areas, upon request of service access from them, and perform joint power control using geo-location information to avoid interference to the incumbent system. The geo-location information includes information about the distance between each CPE and the protected contour 166 of the incumbent system and the locations of the CPE.

The joint power control is carried out so that signals from the CPEs 104, 106 and 108 do not cross the protected contour 166 of the incumbent system. If the signals cross the protected contour 166 of the incumbent system, they interfere with the IUs 154, 158 and 160 during TV reception. Thus, the BSs 100 and 130 transmit data to the CPEs 102 to 112 and 132 to 138 with transmit power that does not go beyond the protected contour 166 of the incumbent system.

Under the joint power control of the BSs 100 and 130, the CPEs 102 to 112 and 132 to 138 transmit signal to the BSs 100 and 130 with transmit power that do not interfere with the IUs 150 to 164 of the incumbent system.

The CR system and the incumbent system can share the same frequency band in two methods. One is that the CR system uses unallocated and unused channels of the incumbent system. The other method is that when transmitters of the incumbent system are remote enough from the CR system, the CR system uses the whole or part of channels allocated to the incumbent system. Thus, the CR system minimized interference to the incumbent system. Herein, the following description is made in the context of the environment of the second method.

In summary, the CR system can detect an unused frequency without causing interference to the IUs 150 to 164 of the incumbent system and has knowledge of the distances between each CPE and the protected contour of the incumbent system.

FIG. 2 is a flowchart of a joint power control operation of a BS in the CR wireless communication system according to an exemplary embodiment of the present invention.

Referring to FIG. 2, the BS receives information from CPEs in step 200. The information is service access requests from the CPEs, for example.

In step 202, the BS schedules the CPEs and controls the transmit power of the CPEs. For example, the BS selects CPEs to be serviced from among the CPEs and allocates transmit power to the selected CPEs.

For each selected CPE, the BS determines whether a specific channel or its adjacent channels are in use in the incumbent system in step 203. If the channel or the adjacent channels are in use, the BS determines whether there is at least one CPE using the same channel among the scheduled CPEs in step 204.

If at least one CPE using the same channel exists, the BS calculates the total interference levels of the CPEs using the same channel, for joint power control in step 206. The total interference level includes interference from the CPEs using the same channel and interference from the adjacent channels. The interference levels of CPEs using the allocated channel can be calculated by a conventional interference measuring technique. For example, the interference level of each CPE can be measured using path loss that is based on the distance from the CPE to the protected contour 166 of the incumbent system as follows:

$$I(P_{CPE,k}, d_{k,n}) \leq T_{max,n} - M' \qquad [\text{Eqn. 1}]$$

In Equation 1, if channel N has m adjacent channels at each of both sides, n denotes one of channels N−m to N+m that may cause interference, k denotes the index of the CPE, $d_{k,n}$ denotes the distance between CPE k and the protected contour 166 of the incumbent system, $I(P_{CPE,k}, d_{k,n})$ denotes the interference level induced by the transmission of CPE k on channel n, $T_{max,n}$ denotes a maximum tolerable interference threshold level at the protected contour 166 for channel n, and M' denotes a predetermined margin for protecting the incumbent system for individual CPE power control. Therefore, Equation 1 describes that the interference from neighbor channels and the interference from the CPE (the interference from a channel used for the CPE) to the protected contour should be equal to or less than the maximum tolerable interference threshold level minus the margin.

If the incumbent system is not using the specific channel or the adjacent channels in step 203, the BS starts a service in step 210.

If more than one CPE are scheduled, the BS starts the service in step 210.

If the total interference level satisfies equation (2) in step 208, the BS starts the service for the scheduled CPEs in step 210. The total interference level is interference received at the protected contour 166 of the incumbent system. If the total interference level satisfies Equation 2, this means that signals from the CPEs 102 to 140 do not affect the IUs 152 to 164 of the incumbent system.

$$\sum_{k=1}^{K} I(P_{CPE,k}, d_{k,n}) \leq T_{max,n} - M \quad \text{[Eqn. 2]}$$

In Equation 2, $d_{k,n}$ denotes the distance between CPE k and the protected contour 166 of the incumbent system, $I(P_{CPE,k}, d_{k,n})$ denotes the interference level induced by the transmission of CPE k on channel n, $T_{max,n}$ denotes a maximum tolerable interference threshold level at the protected contour 166 of primary users using channel n, and M denotes a predetermined margin for protecting the incumbent system for individual CPE power control. Therefore, Equation 2 describes that the sum of interferences from the CPEs to the protected contour should be equal to or less than the maximum tolerable interference threshold level minu the margin.

If the total interference level does not satisfy Equation 2, the BS reduces the power of the scheduled CPEs in step 212. Because primary users are interfered by the transmit power of the CPEs, the BS reduces the power of the CPEs so that the transmit power of the CPEs do not exceed an allowed power level. The transmit power of the CPEs can be reduced at an equal percentage or by an equal value. The percentage-based power reduction is expressed as:

$$P_{CPE,k}^{new} = P_{CPE,k}(1-\Delta_k\%) \quad \text{[Eqn. 3]}$$

In Equation 3, $\Delta_k$ denotes a predetermined positive percentage constant for each CPE ($\Delta_k$>0), $P_{CPE,k}$ denotes the power of CPE k before joint power control, and $P_{CPE,k}^{new}$ denotes the power of CPE k after the joint power control.

The BS returns to step 206 and calculates the total interference level of the CPEs. The BS then compares the total interference level with an interference level threshold in step 208.

Then, the BS ends the joint power control.

FIG. 3 is a block diagram for a joint power control apparatus of the BS in the CR wireless communication system according to an exemplary embodiment of the present invention.

Referring to FIG. 3, the joint power control apparatus includes a Radio Frequency (RF) processor 300, an Analog-to-Digital Converter (ADC) 302, an Orthogonal Frequency Division Multiplexing (OFDM) demodulator 304, a decoder 306, a controller 308, a scheduler 310, a path loss calculator 312, a power controller 314, an encoder 316, an OFDM modulator 318, a Digital-to-Analog Converter (DAC) 320, and an RF processor 322.

The RF processor 300 downconverts an RF signal received through an antenna. The ADC 302 converts the analog signal received form the RF processor 300 to sample data. The OFDM demodulator 304 converts the sample data to frequency data by Fast Fourier Transform (FFT).

The decoder 306 selects data on desired subcarriers from the frequency data and demodulates and decodes the selected data at a predetermined Modulation and Coding Scheme (MCS) level.

The controller 308 analyzes a control message received from the decoder 308 and operates in accordance with the analysis. In accordance with the present invention, the controller 308 performs joint power control by controlling the scheduler 310, the path loss calculator 312, and the power controller 314.

The scheduler 310 receives information about CPEs that request a service from the controller 308 and selects CPEs to be serviced by scheduling.

The path loss calculator 312 calculates the interference levels of scheduled CPEs using the same channel and the interference level of adjacent channels based on information about the CPEs, geo-location information, and information about interference from the channels neighboring to the used channel by Equations 1 and 2. The geo-location information is received from the GPS or if the CPEs are fixed, manually input coordinates can be received from the CPEs.

The power controller 314 determines whether to perform a joint power control by comparing a total interference level calculated by the path loss calculator 312 with an interference level threshold and notifies the controller 308 of the decision. The interference level threshold is set taking into account the interference levels of the adjacent channels and the interference levels of the CPEs using the same channel.

During the joint power control, the transmit power of each CPE is reduced at a percentage or by a value.

The controller 308 generates a control message including information about transmit power determined through the joint power control.

The encoder 316 encodes and modulates the control message at a predetermined MCS level. The OFDM modulator 318 converts the modulated data to sample data (i.e., an OFDM symbol) by Inverse Fast Fourier Transform (IFFT). The DAC 320 converts the same data to an analog signal. The RF processor 322 upconverts the analog signal to an RF signal and transmits the RF signal through an antenna.

The joint power control apparatus and method described above with reference to FIGS. 2 and 3 are for uplink joint power control. The joint power control can be performed at a CPE by receiving geo-location information from the BS. Also, an upper-layer network entity above the BS can carry out a joint power control for the downlink from the BS to the CPE.

As is apparent from the above description, the present invention advantageously enables frequency sharing without causing interference to an incumbent system by joint power control in a CR wireless communication system.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for controlling power in a cognitive radio wireless communication system, the method comprising:
   selecting a plurality of customer premise equipments of the cognitive radio wireless communication system wherein the plurality of customer premise equipments affect an incumbent system different than the cognitive radio wireless communication system;

allocating a transmit power of each of the selected customer premise equipments;

calculating an interference level of each of the selected customer premise equipments using the transmit power of each of the selected customer premise equipments and a path loss of each of the selected customer premise equipments according to a distance between the each customer premise equipment and a protected contour of the incumbent system; and calculating a total interference level affecting the incumbent system by summing the interference levels of the selected customer premise equipments.

2. The method of claim 1, wherein the interference level calculation comprises calculating the interference level of the customer premise equipments using the following equation, $$I(P_{CPE,k}, d_{k,n}) = P_{CPE,k} \cdot PL(d_{k,n})$$

wherein $d_{k,n}$ denotes a distance between a customer premise equipment k and the protected contour of the incumbent system, $I(P_{CPE,k}, d_{k,n})$ denotes an interference level induced by transmission of the customer premise equipment k, and $PL(d_{k,n})$ denotes a path loss from the customer premise equipment k to the protected contour of the incumbent system according to a channel model.

3. The method of claim 2, wherein the distance between the customer premise equipment and the protected contour of the incumbent system is calculated using at least one of Global Positioning System (GPS) information and statistical distance information.

4. The method of claim 1, wherein when the customer premise equipment is fixed, a distance between the customer premise equipment and the protected contour of the incumbent system is calculated using manually input location coordinates.

5. The method of claim 1, further comprising, when the total interference level is larger than a threshold, reducing a transmit power of the customer premise equipment at a predetermined ratio or by a predetermined decrement.

6. The method of claim 5, wherein the transmit power reduction comprises reducing the transmit power of the customer premise equipment using the following equation, $$P_{CPE,k}^{new} = P_{CPE,k}(1 - \Delta_k\%)$$

where $\Delta_k$ denotes a predetermined positive percentage constant for each customer premise equipment $k(\Delta_k>0)$, $P_{CPE,k}$ denotes a second power of the customer premise equipment k before a joint power control, and $P_{CPE,k}^{new}$ denotes a third power of the customer premise equipment k after the joint power control.

7. The method of claim 1, further comprising, when the total interference level is less than a threshold, allocating a transmit power satisfying the total interference level to each customer premise equipment.

8. The method of claim 1, wherein the interference level calculation comprises calculating the interference level of the customer premise equipment taking into account a second interference from an adjacent channel and a second plurality of interference levels of other customer premise equipments using the same channel.

9. The method of claim 1, further comprising determining whether a specific channel or its adjacent channels are in use.

10. The method of claim 1, further comprising determining whether there is at least one customer premise equipment using the same channel among the scheduled the customer premise equipments.

11. An apparatus for controlling power in a cognitive radio wireless communication system, the apparatus comprising:

a scheduler configured to select a plurality of customer premise equipments of the cognitive radio wireless communication system wherein the plurality of customer premise equipments affect an incumbent system different than the cognitive radio wireless communication system;

a power controller configured to allocate a transmit power of each of the selected customer premise equipments; and a path loss calculator configured to calculate an interference level for each of the selected customer premise equipments using the transmit power of each of the selected customer premise equipments and a path loss of each of the selected customer premise equipments according to a distance between the each customer premise equipment and a protected contour of the incumbent system, and calculate a total interference level that reaches a protected contour of the incumbent system using the interference levels of the selected customer premise equipments;

the power controller further configured, when the total interference level is larger than a threshold, to reduce a transmit power of the customer premise equipment.

12. The apparatus of claim 11, wherein the path loss calculator calculates the interference level of the customer premise equipment, using the following equation, $$I(P_{CPE,k}, d_{k,n}) = P_{CPE,k} \cdot PL(d_{k,n})$$

wherein $d_{k,n}$ denotes a distance between a customer premise equipment k and the protected contour of the incumbent system, $I(P_{CPE,k}, d_{k,n})$ denotes an interference level induced by a transmission of the customer premise equipment k, and $PL(d_{k,n})$ denotes a path loss from the customer premise equipment k to the protected contour of the incumbent system according to a channel model.

13. The apparatus of claim 12, wherein the distance between the customer premise equipment and the protected contour of the incumbent system is calculated using at least one of Global Positioning System (GPS) information and statistical distance information.

14. The apparatus of claim 11, wherein when the customer premise equipment is fixed, the distance between the customer premise equipment and the protected contour of the incumbent system is calculated using manually input location coordinates.

15. The apparatus of claim 11, wherein the power controller is configured to reduce the transmit power of the customer premise equipment at a predetermined ratio or by a predetermined decrement.

16. The apparatus of claim 15, wherein the power controller reduces the transmit power of the customer premise equipment using the following equation, $$P_{CPE,k}^{new} = P_{CPE,k}(1 - \Delta_k\%)$$

where $\Delta_k$ denotes a predetermined positive percentage constant for the customer premise equipment $k(\Delta_k>0)$, $P_{CPE,k}$ denotes a second power of the customer premise equipment k before a joint power control, and $P_{CPE,k}^{new}$ denotes a third power of the customer premise equipment k after the joint power control.

17. The apparatus of claim 11, further comprising a controller configured, when the total interference level is less than a threshold, to allocate a second transmit power satisfying the total interference level to each of the customer premise equipments.

18. The apparatus of claim 11, wherein the path loss calculator calculates the interference level of the customer premise equipment taking into account a second interference from an adjacent channel and a second plurality of interference levels of those customer premise equipments using the same channel.

19. The apparatus of claim 11, wherein further comprising a controller configured to determine whether a specific channel or its adjacent channels are in use.

20. The apparatus of claim 11, further comprising a controller configured to determine whether there is at least one customer premise equipment using the same channel among the scheduled the customer premise equipments.

21. A method for controlling power in a cognitive radio wireless communication system, the method comprising:
    calculating an interference level of each of a plurality of base stations of the cognitive radio wireless communication system that affects an incumbent system different than the cognitive radio wireless communication system, using a transmit power of each of the base stations and a path loss of each of the base stations according to a distance between the each base station and a protected contour of the incumbent system;
    calculating a total interference level affecting the incumbent system by summing the interference levels of the base stations; and
    reducing a transmit power of at least one of the base stations, when the total interference level is larger than a threshold.

22. The method of claim 21, wherein the distance between the base station and the protected contour of the incumbent system is calculated using at least one of Global Positioning System (GPS) information and statistical distance information.

23. A method for controlling power in a cognitive radio wireless communication system, the method comprising:
    acquiring an interference level of each of neighboring base stations of the cognitive radio wireless communication system adjacent to a first base station, the interference level affecting an incumbent system different than the cognitive radio wireless communication system, the interference level calculated using a transmit power of each of the neighboring base stations and a path loss of each of the neighboring base stations according to a distance between the each neighboring base station and a protected contour of the incumbent system;
    calculating a total interference level affecting the incumbent system by summing the interference level of the first base station and interference levels of the neighboring base stations; and
    reducing a transmit power of each of the first base station and the neighboring base stations, when the total interference level is larger than a threshold.

24. The method of claim 23, further comprising notifying the neighboring base stations of reduced transmit power values, after the power reduction.

* * * * *